(12) United States Patent
Otsuka et al.

(10) Patent No.: US 11,866,365 B2
(45) Date of Patent: Jan. 9, 2024

(54) COVER GLASS FOR DISPLAY, IN-VEHICLE DISPLAY DEVICE, AND MANUFACTURING METHOD OF COVER GLASS FOR DISPLAY

(71) Applicant: AGC Inc., Tokyo (JP)

(72) Inventors: Kazutaka Otsuka, Tokyo (JP); Kyushiro Igarashi, Tokyo (JP); Takeshi Shimizu, Tokyo (JP); Minoru Tamada, Tokyo (JP)

(73) Assignee: AGC Inc., Tokyo (JP)

( * ) Notice: Subject to any disclaimer, the term of this patent is extended or adjusted under 35 U.S.C. 154(b) by 492 days.

(21) Appl. No.: 17/144,197

(22) Filed: Jan. 8, 2021

(65) Prior Publication Data

US 2021/0214268 A1 Jul. 15, 2021

(30) Foreign Application Priority Data

Jan. 14, 2020 (JP) .................. 2020-003488

(51) Int. Cl.
| | |
|---|---|
| *B32B 15/04* | (2006.01) |
| *B32B 17/06* | (2006.01) |
| *C03C 3/087* | (2006.01) |
| *G02B 1/18* | (2015.01) |
| *B60K 35/00* | (2006.01) |
| *C03B 5/183* | (2006.01) |
| *C03B 5/187* | (2006.01) |
| *C03B 5/23* | (2006.01) |

(Continued)

(52) U.S. Cl.
CPC ............. *C03C 3/087* (2013.01); *B60K 35/00* (2013.01); *B60K 37/02* (2013.01); *C03B 5/183* (2013.01); *C03B 5/187* (2013.01); *C03B 5/23* (2013.01); *C03C 3/083* (2013.01); *C03C 3/095* (2013.01); *C03C 17/3405* (2013.01); *G02B 1/18* (2015.01); *B60K 2370/27* (2019.05); *B60K 2370/693* (2019.05); *B60K 2370/98* (2019.05); *C03C 17/00* (2013.01); *C03C 21/002* (2013.01); *C03C 2204/08* (2013.01)

(58) Field of Classification Search
CPC .................................................... C03C 2204/08
USPC ................................................. 428/410, 426
See application file for complete search history.

(56) References Cited

U.S. PATENT DOCUMENTS

| | | | |
|---|---|---|---|
| 2010/0199720 A1* | 8/2010 | Roemer ................. | C03B 5/43 65/134.1 |
| 2018/0282202 A1* | 10/2018 | Saito ..................... | C03B 5/187 |
| 2021/0214268 A1* | 7/2021 | Otsuka .................. | B60K 37/02 |

FOREIGN PATENT DOCUMENTS

JP 2018-062449 A 4/2018

* cited by examiner

*Primary Examiner* — Lauren R Colgan
(74) *Attorney, Agent, or Firm* — Oblon, McClelland, Maier & Neustadt, L.L.P.

(57) ABSTRACT

The present invention relates to a cover glass for a display, which is a glass plate having a first main surface and a second main surface. The cover glass contains, as represented by mol percentage based on oxides, from 50 to 75% of $SiO_2$, from 5 to 20% of $Al_2O_3$, from 2 to 20% of $Na_2O$, from 0 to 6% of $K_2O$, from 0 to 15% of MgO, from 0 to 10% of a total amount (CaO+SrO+BaO) of CaO, SrO and BaO, from 0 to 5% of a total amount ($ZrO_2+TiO_2$) of $ZrO_2$ and $TiO_2$, from 0 to 10% of $B_2O_3$, and from 0 to 20% of $Li_2O$. The cover glass has a ream minimum distance of 100 mm or more and 1,000 mm or less, and a ream period of 1 mm or more and 30 mm or less.

13 Claims, 3 Drawing Sheets

(51) Int. Cl.
*B60K 37/02* (2006.01)
*C03C 3/095* (2006.01)
*C03C 3/083* (2006.01)
*C03C 17/34* (2006.01)
*C03C 17/00* (2006.01)
*C03C 21/00* (2006.01)

COVER GLASS FOR DISPLAY, IN-VEHICLE DISPLAY DEVICE, AND MANUFACTURING METHOD OF COVER GLASS FOR DISPLAY

TECHNICAL FIELD

The present invention relates to a cover glass for a display, an in-vehicle display device, and a production method of a cover glass for a display.

BACKGROUND ART

In recent years, a protective plate (hereinafter, referred to as a cover glass for a display) for enhancing protection and appearance of a visual surface, i.e., a display is often used in mobile devices such as tablet PC (Personal Computer) and smartphone, or display devices such as liquid crystal television and touch panel (hereinafter, these are sometimes collectively referred to as a display device, etc.).

With the progress in high definition of displays, the requirement on the quality of a cover glass for a display is getting severer. Patent Literature 1 describes that a striped optical distortion called a ream deteriorates the visibility and in order to improve it, the ream minimum distance is adjusted to 780 mm or more.

Furthermore, in an in-vehicle display device such as car navigation system, an antiglare property is sometimes imparted to a cover glass for a display so as to more increase the display visibility. For imparting the antiglare property, several methods are known but, among others, a method of applying a frost treatment to a glass surface to form an uneven structure (hereinafter, sometimes referred to as AG processing) is often employed.

Patent Literature 1: JP-A-2018-62449

SUMMARY OF INVENTION

The present inventors have newly found that when the glass plate described in Patent Literature 1 is subjected to AG processing and then assembled on the surface of a display, striped optical unevenness (display unevenness) sometimes appears. In this case, the visibility is insufficient.

Accordingly, an object of the present invention is to provide a display cover glass having excellent visibility.

As a result of intensive studies on the object above, the present inventors have found that when the following glass is used, striped optical unevenness can be reduced even after AG processing. That is, the present invention provides the following [1] to [13].

[1] A cover glass for a display, which is a glass plate having a first main surface and a second main surface, the cover glass containing, as represented by mol percentage based on oxides, from 50 to 75% of $SiO_2$, from 5 to 20% of $Al_2O_3$, from 2 to 20% of $Na_2O$, from 0 to 6% of $K_2O$, from 0 to 15% of MgO, from 0 to 10% of a total amount (CaO+SrO+BaO) of CaO, SrO and BaO, from 0 to 5% of a total amount ($ZrO_2$+$TiO_2$) of $ZrO_2$ and $TiO_2$, from 0 to 10% of $B_2O_3$, and from 0 to 20% of $Li_2O$, having a ream minimum distance of 100 mm or more and 1,000 mm or less, and having a ream period of 1 mm or more and 30 mm or less.

[2] The cover glass for a display according to [1], wherein the ream period is 2 mm or more and 10 mm or less.

[3] The cover glass for a display according to [1] or [2], wherein the first main surface has an uneven structure.

[4] The cover glass for a display according to [3], wherein a surface roughness Ra of the first main surface is 0.01 µm or more and 0.5 µm or less, a pitch RSm of the uneven structure of the first main surface is 0.003 mm or more and 0.050 mm or less, a transmission haze is 1% or more and 15% or less, and a ratio of the ream period to the RSm is 100 or more and 1,000 or less.

[5] The cover glass for a display according to [3] or [4], wherein an anti-sparkle value S is 0.84 or more, a reflection image diffusiveness index value R is 0.02 or more, and a clarity value T is 0.8 or more.

[6] The cover glass for a display according to any one of [1] to [5], including an antifouling layer on or above the first main surface.

[7] The cover glass for a display according to any one of [1] to [6], including an adhesive layer and an antifouling layer on or above the first main surface in this order.

[8] The cover glass for a display according to any one of [1] to [7], which has been subjected to a chemical strengthening treatment, the cover glass having a surface compressive stress of 500 MPa or more and 1,200 MPa or less, and a depth of a surface compressive stress layer of 10 µm or more and 150 µm or less.

[9] An in-vehicle display device including a display and the cover glass for a display according to any one of [1] to [8] which covers the display.

[10] The in-vehicle display device according to [9], wherein an angle made by a direction parallel to a ream of the cover glass for a display and a pixel direction of the display is 0° or more and 5° or less, or 850 or more and 90° or less.

[11] A production method of a cover glass for a display according to any one of [1] to [8], wherein a plurality of stirrers are provided in a neck part of a melting tank along a width direction of the neck part, and a stirring condition of the stirrers is set to be 1 rpm or more and 25 rpm or less.

[12] A production method of a cover glass for a display according to any one of [1] to [8], wherein a melting tank including a melting bath, a neck part, and a cooling bath is used, and thermal insulation tiles on a side wall of the cooling bath are partially removed.

[13] A production method of a cover glass for a display according to any one of [1] to [8], wherein a cooler is inserted into an upper space of a cooling bath by a length of more than 0 and 0.7 or less in terms of a ratio relative to a width of the cooling bath.

According to the present invention, a display cover glass having excellent visibility can be provided.

DESCRIPTION OF EMBODIMENTS (Glass Plate)

A first embodiment of the cover glass for a display of the present embodiment contains, as represented by mol percentage based on oxides, from 50 to 75% of $SiO_2$, from 5 to 20% of $Al_2O_3$, from 2 to 20% of $Na_2O$, from 0 to 6% of $K_2O$, from 0 to 15% of MgO, from 0 to 10% of a total amount (CaO+SrO+BaO) of CaO, SrO and BaO, from 0 to 5% of a total amount ($ZrO_2+TiO_2$) of $ZrO_2$ and $TiO_2$, from 0 to 10% of $B_2O_3$, and from 0 to 20% of $Li_2O$.

In the following, each component in the glass composition is described. In the present description below, the content of each component is expressed as represented by mol percentage based on oxides.

$SiO_2$ is a main component constituting glass. This is a component reducing the occurrence of cracking when a scratch (indentation) is formed on the glass surface, or decreasing the fracture rate when an indentation is formed after chemical strengthening treatment. Furthermore, $SiO_2$ is a component enhancing the acid resistance of the glass and decreasing the sludge amount at the time of etching treatment (hydrofluoric acid resistance). Accordingly, the $SiO_2$ content is 50% or more. The $SiO_2$ content is preferably 55% or more, more preferably 60% or more, still more preferably 63% or more.

On the other hand, in the case where the $SiO_2$ content is too large, the viscosity tends to increase excessively to reduce the productivity such as meltability or formability. Therefore, the $SiO_2$ content is 75% or less. The $SiO_2$ content is preferably 73% or less, more preferably 71% or less, still more preferably 70% or less, yet still more preferably 67% or less, even yet still more preferably 65% or less.

As the content of $Al_2O_3$ is larger, CS (surface compressive stress) during chemical strengthening treatment can be higher. Accordingly, the $Al_2O_3$ content is 5% or more. The $Al_2O_3$ content is preferably 7% or more, more preferably 8% or more.

On the other hand, in the case where the $Al_2O_3$ content is too large, DOL (depth of surface compressive stress layer) during chemical strengthening treatment is reduced. Therefore, the $Al_2O_3$ content is 20% or less. The $Al_2O_3$ content is preferably 18% or less, more preferably 15% or less, still more preferably 13.5% or less, yet still more preferably 12% or less, even yet still more preferably 11% or less.

$Na_2O$ is an essential component forming a surface compressive stress layer by ion exchange during chemical strengthening treatment and has an action of making DOL deep. In addition, $Na_2O$ is a component lowering the melting temperature and devitrification temperature of the glass and enhancing the meltability and formability of the glass. $Na_2O$ is a component creating a non-bridging oxygen and reduces fluctuation of chemical strengthening characteristics when the amount of water in glass changes.

As the content of $Na_2O$ is larger, DOL during chemical strengthening treatment can be made deeper. Accordingly, the $Na_2O$ content is 2% or more. The $Na_2O$ content is preferably 3% or more, more preferably 5% or more, still more preferably 10% or more, yet still more preferably 11% or more.

On the other hand, in the case where the $Na_2O$ content is too large, CS during chemical strengthening treatment decreases. Since DUV resistance for preventing the reduction of the transmittance in a specific wavelength range of ultraviolet rays in a wavelength region called Deep UV (DUV) decreases due to Non-Bridging Oxygen (NBO) constituting $Na_2O$, in view of DUV resistance, the number of non-bridging oxygens is preferably smaller. Therefore, the $Na_2O$ content is 20% or less. The $Na_2O$ content is preferably 19% or less, more preferably 18.5% or less, still more preferably 17% or less, yet still more preferably 16.5% or less.

The $K_2O$ content is from 0 to 6%. $K_2O$ has an effect of increasing an ion exchange rate to make DOL deep during chemical strengthening treatment and lowering the melting temperature of glass, and is a component increasing the number of non-bridging oxygens. In addition, an increase in the change of surface compressive stress due to $NaNO_3$ concentration in a potassium nitrate molten salt used in chemical strengthening treatment can be avoided. Furthermore, a small amount of $K_2O$ has an effect of suppressing the amount of tin intruded from a bottom surface at the time of forming by a float process. Therefore, it is preferable to contain this component when forming the glass of this embodiment by a float process. In order to provide the effects above, the content of $K_2O$ in the glass for chemical strengthening of this embodiment is preferably 0.1% or more, more preferably 0.3% or more, still more preferably 0.4% or more.

On the other hand, in the case where the content of $K_2O$ is too large, CS during chemical strengthening treatment decreases. In addition, since DUV resistance decreases due to Non-Bridging Oxygen (NBO) constituting $K_2O$, in view of DUV resistance, the number of non-bridging oxygens is preferably smaller. For these reasons, the $K_2O$ content is 6% or less, preferably 4% or less, more preferably 2% or less, still more preferably 1.3% or less, yet still more preferably 1% or less.

The MgO content is 0 to 15%. MgO is a component capable of stabilizing glass, enhancing the meltability, and when added, reducing the content of alkali metals to thereby suppress an increase in the coefficient of thermal expansion (CTE). In order to provide these effects, the content of MgO is preferably 2% or more, more preferably 4% or more, still more preferably 6% or more, yet still more preferably 8% or more.

On the other hand, considering maintaining DOL, the content of MgO is 15% or less, preferably 13% or less, more preferably 12% or less, still more preferably 10.5% or less, yet still more preferably 9% or less.

CaO is a component stabilizing glass and has an effect of preventing devitrification due to the presence of MgO and enhancing the meltability while suppressing an increase in CTE. Therefore, this component may be contained. The content of CaO is preferably from 0 to 5%, more preferably from 0 to 3%, still more preferably from 0 to 1%. In the case where the content of CaO is 5% or less, a sufficient ion exchange rate is obtained during chemical strengthening treatment, and desired DOL is likely to be obtained. Also, in the case of intending to remarkably enhance the ion exchange performance during chemical strengthening treatment, the content of CaO is preferably less than 1%, more preferably 0.5% or less.

SrO may be contained, if desired, but this component has a large effect of lowering the ion exchange rate, compared with MgO and CaO. Therefore, it is preferred that SrO is not substantially contained or even when contained, the content thereof is 3% or less. The expression "not substantially contained" as used in the present description means that the component is not contained excluding unavoidable impurities, and the content thereof is, for example, preferably less than 0.05%, more preferably less than 0.01%.

BaO has, among alkaline earth metal oxides, a largest effect of decreasing the ion exchange rate during chemical strengthening treatment. Therefore, it is preferred that BaO is not substantially contained, or even when contained, the content thereof is preferably 3% or less, more preferably 1% or less, still more preferably 0.5% or less.

The total (CaO+SrO+BaO) of the contents of three components of CaO, SrO and BaO is 0 to 10%. In the case where the total is 10% or less, a decrease in the ion exchange rate can be avoided. The total is preferably 5% or less, more preferably 3% or less, still more preferably 1% or less, yet still more preferably 0.5% or less, even yet still more preferably 0.2% or less.

$TiO_2$ is a component enhancing the DUV resistance and therefore, may be contained. The $TiO_2$ content is preferably more than 0%, more preferably 0.01% or more, still more preferably 0.03% or more.

On the other hand, in the case where the content of $TiO_2$ is too large, DOL during chemical strengthening treatment decreases. Therefore, the $TiO_2$ content is preferably 5% or less, more preferably 3% or less, still more preferably 1% or less, yet still more preferably 0.5% or less, even yet still more preferably 0.3% or less.

$ZrO_2$ is a component imparting excellent DUV resistance, enhancing chemical durability, increasing CS during chemical strengthening treatment, and, at the same time, improving the Vickers hardness after chemical strengthening treatment and may be contained. The $ZrO_2$ content is preferably 0.1% or more, more preferably 0.11% or more, still more preferably 0.12% or more, yet still more preferably 0.13% or more.

On the other hand, from the viewpoint of suppressing devitrification at the time of production of glass and preventing a decrease in DOL during chemical strengthening treatment, the content of $ZrO_2$ is preferably 4% or less, more preferably 3% or less, still more preferably 2% or less, yet still more preferably 1.5% or less, even yet still more preferably 1% or less.

$Y_2O_3$ may not be contained but is preferably contained, because this is a component decreasing the crystal growth rate while increasing the surface compressive stress of chemically strengthened glass. The content of $Y_2O_3$ is preferably 0.1% or more, more preferably 0.2% or more, still more preferably 0.5% or more, yet still more preferably 0.8% or more, even yet still more preferably 1% or more. On the other hand, in the case where the content of $Y_2O_3$ is too large, it is difficult to make the surface compressive stress layer large during chemical strengthening treatment. The content of $Y_2O_3$ is preferably 5% or less, more preferably 3% or less, still more preferably 2% or less, yet still more preferably 1.5% or less.

It is preferable for the glass according to this embodiment to contain both $TiO_2$ and $ZrO_2$. However, the total ($TiO_2$+$ZrO_2$) of the contents of two components of $ZrO_2$ and $TiO_2$ is 0 to 5%. In the case where the total is 5% or less, a decrease in DOL during chemical strengthening can be prevented. The total is preferably 3% or less, more preferably 2% or less, still more preferably 1% or less, yet still more preferably 0.5% or less. The total is preferably 0.1% or more.

In the glass according to this embodiment, the contents of $Na_2O$, $K_2O$, $Al_2O_3$, $ZrO_2$, and $TiO_2$, as represented by mol percentage based on oxides, preferably satisfy the relationship that $[(Na_2O+K_2O\times 5)/(Al_2O_3+ZrO_2+TiO_2\times 10)]$ is 2.55 or less.

As described above, $Na_2O$ and $K_2O$ are components enabling DOL to be deep but, on the other hand, decreasing CS or DUV resistance. In addition, these are components enabling a temperature T2 at which the viscosity of glass reaches $10^2$ dPa·s or a temperature T4 at which the viscosity of glass reaches $10^4$ dPa·s, to drop and thereby contributing to good productivity.

$Al_2O_3$, $ZrO_2$ and $TiO_2$ are components enabling CS or DUV resistance to increase but, on the other hand, decreasing DOL. In addition, $Al_2O_3$ is a component increasing the temperature T2 or the temperature T4. In the case where its content is too large, the productivity such as meltability or formability is reduced.

More specifically, in view of balance of CS, DOL, acid resistance, and productivity, the value represented by $[(Na_2O+K_2O\times 5)/(Al_2O_3+ZrO_2+TiO_2\times 10)]$ is preferably 2.55 or less, more preferably 2.00 or less, still more preferably 1.90 or less, yet still more preferably 1.80 or less, even yet still more preferably 1.71 or less, and is preferably 0.10 or more, more preferably 0.50 or more, still more preferably 1.00 or more.

In this embodiment, among others, in order to increase CS or enhance the acid resistance, the contents, expressed as represented by mol percentage based on oxides, of $Al_2O_3$ and $K_2O$ preferably satisfy the relationship that $Al_2O_3/K_2O$ is more than 10. The $Al_2O_3/K_2O$ is more preferably 10.5 or more, still more preferably 11.5 or more, yet still more preferably 12.5 or more, even yet still more preferably 14.0 or more, and most preferably 15.0 or more.

The contents of MgO, $Na_2O$, $K_2O$, $ZrO_2$, and $TiO_2$ as represented by mol percentage based on oxides, preferably satisfy the relationship that $[(MgO/2+Na_2O+K_2O\times 2)/(TiO_2+ZrO_2)]$ is from 53 to 140, because the amount of sludge at the time of etching can be reduced (hydrofluoric acid resistance can be enhanced). The value represented by $[(MgO/2+Na_2O+K_2O\times 2)/(TiO_2+ZrO_2)]$ is more preferably 130 or less, still more preferably 125 or less, yet still more preferably 120 or less, and is more preferably 55 or more, still more preferably 60 or more.

$B_2O_3$ is a component promoting the melting of glass raw materials and improving the brittleness or weather resistance of glass and therefore, may be contained. $B_2O_3$ may not be contained, but when contained, the content thereof is 10% or more, and in this case, the fracture rate when Vickers indentation is formed after chemical strengthening can be reduced, or the meltability at high temperature is enhanced. In order not to generate disadvantages such as formation of ream due to volatilization from molten glass or corrosion of a furnace wall, the content of $B_2O_3$ is 10% or less, preferably 8% or less, more preferably 6% or less, still more preferably 4% or less, yet still more preferably 3% or less, even yet still more preferably 1% or less.

$Li_2O$ excessively decreases a strain point and low temperature viscosity to easily cause stress relaxation, leading to a decrease in CS during chemical strengthening treatment, and therefore, may not be substantially contained. $Li_2O$ sometimes elutes in a molten salt such as $KNO_3$ during chemical strengthening treatment, but when chemical strengthening treatment is performed using a Li-containing molten salt, CS significantly decreases. Therefore, from this standpoint as well, $Li_2O$ may not be substantially contained. On the other hand, $Li_2O$ can create a compressive stress by exchanging ions with $Na_2O$ and $K_2O$. In particular, when $Li_2O$ exchanges ions with $Na_2O$, the ion exchange proceeds at a fast rate, and this is suitable for shortening the chemical strengthening treatment time. Furthermore, $Li_2O$ is a component increasing the Young's modulus of glass and in the case of a thin or large glass plate, is a component that is effective against its own weight. The content of $Li_2O$ is 20% or less, preferably 16% or less, more preferably 12% or less. In the case of exchanging ions between $Li_2O$ and $Na_2O$ or $K_2O$, the content of $Li_2O$ is preferably 3% or more, more preferably 5% or more, still more preferably 8% or more.

Examples of the composition of the glass in another embodiment of the present invention include a glass containing, as represented by mol % based on oxides, from 50 to 75% of $SiO_2$, from 1 to 25% of $Al_2O_3$, and from 3 to 25% in total of $Li_2O$, $Na_2O$ and $K_2O$. The composition includes, for example, the following glass compositions: as represented by mol % based on oxides, (i) a glass containing from 55 to 75% of $SiO_2$, from 8 to 25% of $Al_2O_3$, from 3 to 20% of $Li_2O$, from 3 to 25% in total of $Li_2O$, $Na_2O$ and $K_2O$, and from 0 to 10% in total of any one or more of MgO, CaO, SrO, BaO and ZnO; (ii) a glass containing from 50 to 70% of $SiO_2$, from 6 to 20% of $Al_2O_3$, from 5 to 20% of $Na_2O$, from 5 to 25% in total of $Li_2O$, $Na_2O$ and $K_2O$, from 1 to 15% of MgO, and from 0 to 5% of CaO; and (iii) a glass containing from 60 to 75% of $SiO_2$, from 1 to 6% of $Al_2O_3$, from 10 to 20% of $Na_2O$, from 10 to 25% in total of $Li_2O$, $Na_2O$ and $K_2O$, from 3 to 20% of MgO, and from 1 to 10% of CaO.

By setting the composition in these ranges, the visibility after the later-described AG processing can be more improved.

The thickness of the cover glass for a display in this embodiment is preferably 0.5 mm or more, more preferably 0.7 mm or more. Within this range, handling is easy and the strength after chemical strengthening treatment is likely to be ensured.

The thickness is preferably 2 mm or less, more preferably 1.5 mm or less, still more preferably 1.3 mm or less. Within this range, even when a touch panel is provided between the cover glass and a display, the performance is hardly hindered.

(Ream)

The ream is a striped optical distortion present in the glass. The ream is generated when a heterogeneous component is present in the molten glass in the process of producing a glass. The heterogeneous component indicates, for example, a glass component that is not sufficiently homogenized and remains heterogeneous; a molten glass component that is generated, for example, by a reaction of molten glass with a furnace material or a gas phase; etc.

The ream is evaluated by the following procedure.

First, one main surface of the cover glass for a display is irradiated with light from a diffusion light source, and transmitted light in the plate thickness direction is projected on a screen. In the glass where ream is generated, the ream is observed as an optical distortion in the projected image on the screen.

Next, when the cover glass for a display and the screen are brought closer in distance and the distance between both reaches a certain distance, the ream is not observed in the projected image on the screen. The shortest distance between both immediately before the ream is not observed in the projected image on the screen is defined as the ream minimum distance.

Figure 5:
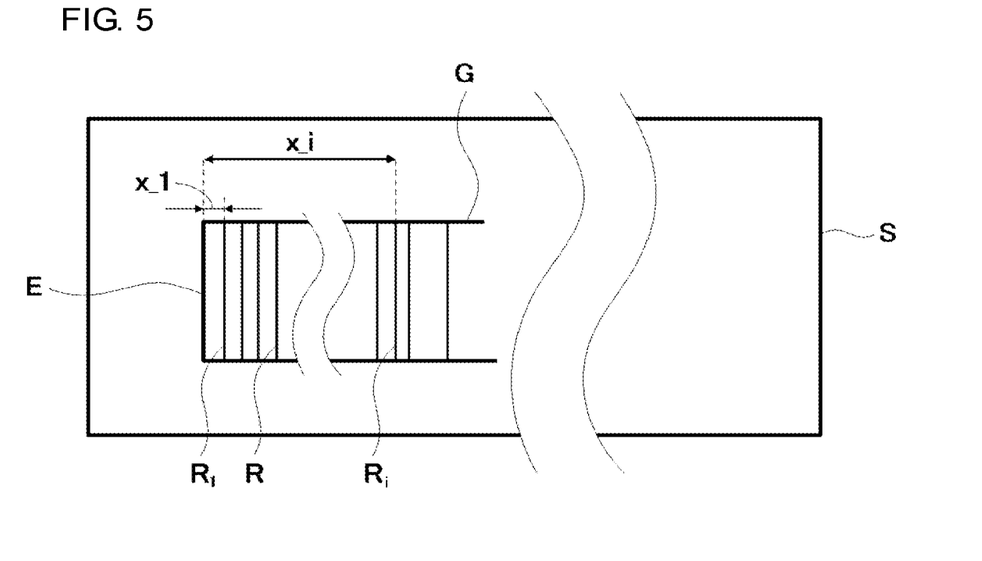
FIG. 5 is a schematic diagram illustrating a projected image at a ream minimum distance.

The definition of the ream period is described using FIG. 5.

FIG. 5 is a schematic diagram illustrating a projected image at a ream minimum distance.

In FIG. 5, an image of glass G is projected on a screen S. With respect to the i-th ream $R_i$ from one end part E of the image of the glass G, the distance moved in a direction perpendicular to the direction of ream $R_i$ from end part E of glass G is denoted as $x\_i$. $x\_i$ is calculated for a sufficient amount of reams R.

Next, each distance between adjacent reams R, i.e., $|x\_2-x\_1|$, $|x\_3-x\_2|$, ... $|x\_i-x\_(i-1)|$, ..., is calculated, and the minimum value among them is denoted as Amin. Then, A when minimizing the following objective function relative to $\Delta$ and $\phi 0$ is defined as the ream period:

$$\Sigma\_i[1-\cos(2\pi x\_i/\Delta+\phi 0)]^2$$

$\Delta \geq \Delta min$ is satisfied and $\Sigma\_i$ indicates that with respect to i, the sum is taken. As for $x\_i$ and $\Delta min$, in consideration of the magnification rate of a projected glass G image on screen S, values calculated in terms of the actual distance are used. $\phi 0$ is a parameter for adjusting the objective function with respect to the distance $x\_1$ from the glass end to the first ream.

This definition makes it possible to estimate the actual ream period even when part of periods are missing.

As for the number of reams R observed, for example, when 10 or more reams from the end part E of glass G are sampled, the ream period can be calculated with high accuracy.

In Patent Literature 1, it is stated that when the ream minimum distance (ream-visible distance) is 780 mm or more, the ream does not pose a problem for use as a cover glass of a potable display device.

However, the present inventors have found that in the case of applying the later-described AG processing, even when the ream minimum distance is less than 780 mm, a problem may not arise in use, and although the ream minimum distance is 780 mm or more, a problem may arise in use.

As a result of intensive studies, the present inventors have newly found that the visibility during use relates not only to the ream minimum distance but also to the ream period. More specifically, when the ream minimum distance is 100 mm or more and 1,000 mm or less and the ream period is 1 mm or more and 30 mm or less, the glass can be suitably used after AG processing is applied.

If the transmission haze after AG processing is less than 15%, the diffusibility of transmitted light is relatively low and therefore, the ream minimum distance can be regarded as not substantially changes before and after AG processing. The ream period does not change as well before and after AG processing.

Accordingly, when the transmission haze is less than 15%, the ream minimum distance and the ream period may be measured before AG processing or may be measured after AG processing.

The cause of the change in the suitable use range after AG processing is presumed as follows.

In the AG processing, it is a common practice as described later to etch the surface with hydrofluoric acid, etc. in a final step.

However, at the time of etching of the surface, there arises a difference in the etching speed and direction between a portion where ream is present and a portion where ream is not present. Consequently, the surface profile is assumed to be slightly deformed.

On the other hand, with respect to the glass surface after AG processing, the later-described frost treatment, etc. allows the presence of a finer uneven structure on the surface. It is presumed that this fine uneven structure and slight deformation of the surface profile due to ream affect one another to cause a change in the visibility during actual use.

Even if the ream minimum distance is less than 780 mm before AG processing, when the ream period is as short as 1 mm or more and 30 mm or less, a minute change region of etching originating from the ream is generated at a relatively narrow period. It is presumed that this change region is overlapped with the uneven structure by AG processing and the visibility during actual usage is thereby improved as a whole.

The ream minimum distance is preferably 150 mm or more, more preferably 200 mm or more. Within this range, the visibility is more improved irrespective of the quality variation of the AG processing.

The ream minimum distance is preferably 780 mm or less, more preferably 500 mm or less. Within this range, homogenization can be achieved in a realistic production time.

The ream period is preferably 2 mm or more, more preferably 5 mm or more. Within this range, a defect such as bubble can hardly be generated.

For the reason that the visibility is more excellent, the ream period is preferably 20 mm or less, more preferably 10 mm or less.

The cover glass of this embodiment can be used for a display device such as in-vehicle display device.

More specifically, the display device (e.g., in-vehicle display device) of this embodiment includes a display and the cover glass of this embodiment for covering the display.

In this case, the angle made by a direction parallel to the ream and a direction of a pixel (hereinafter, sometimes referred to as "pixel direction") of the display is preferably 0° or more and 5° or less, or 85° or more and 90° or less. Here, the pixel direction indicates one of two directions connecting adjacent pixels to each other out of pixels formed in a matrix manner. Another direction makes an angle of 90° with the pixel direction.

By setting the direction of ream and the direction of pixel as above, the effect of distortion in a direction crossing a pixel can be reduced, and the visibility at the time of use can be improved.

(Production Method of Glass)

For the production of the glass of this embodiment, a known glass production apparatus can be used. More specifically, glass raw materials prepared to afford the composition above are continuously charged into a melting tank and heated at a predetermined temperature to make a molten glass. Thereafter, the molten glass is formed into a plate glass having a predetermined plate thickness by a float process or a fusion process, and the plate glass is cut into a predetermined shape.

Figure 1:
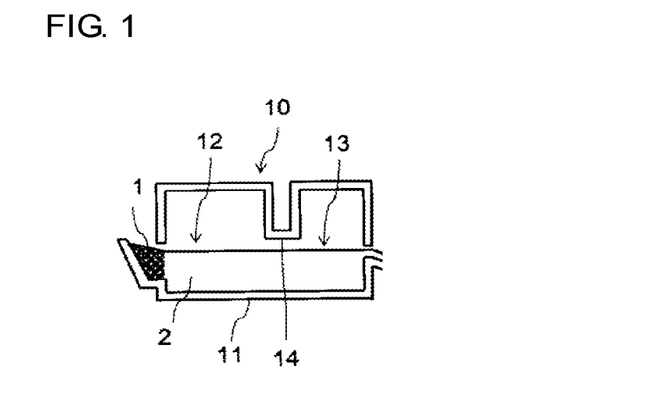
FIG. 1 is a schematic diagram illustrating a configuration example of the melting tank.

FIG. 1 illustrates a configuration example of the melting tank.

In the production of a glass by a float process, first, glass raw materials are melted in a melting furnace 10 to obtain a molten glass.

The melting furnace 10 has a melting tank 11, and in the melting tank 11, the glass raw materials 1 charged are melted to obtain a molten glass 2. More specifically, the melting tank 11 has a melting bath 12 on the upstream side, a cooling bath 13 on the downstream side, and a neck part 14 (or throat) connecting those baths. The glass raw materials 1 are melted into a molten glass 2 on the upstream side (i.e., melting bath 12), and the temperature of the molten glass 2 is adjusted on the downstream side (i.e., cooling bath 13).

A stirrer (not shown) is sometimes provided inside the melting tank 11 so as to homogenize the glass.

Furthermore, in the cooling bath 13, a water-cooled cooler (not shown) is sometimes provided in the upper part inside the cooling bath 13 so as to cool the glass.

In order to adjust the ream minimum distance to 100 mm or more and 1,000 mm or less and the ream period to 1 mm or more and 30 mm or less, for example, the following method is preferably used.

In the case of disposing a vertical stirrer in the neck part 14, a plurality of stirrers are provided along the width direction of the neck part 14 according to the length in the width direction of the neck part 14, and the stirring conditions are set in a range not allowing bubbles to be frequently generated, between 1 rpm or more and 25 rpm or less. By employing such a configuration, the homogeneity is enhanced, and the ream period can be easily adjusted to 30 mm or less. In the case of a horizontal (comb-type) stirrer, the stirrer is inserted from one side or both sides of the neck part 14, and the rotational speed is set in the range not allowing bubbles to increase, similarly, between 1 rpm or more and 10 rpm or less. In the case of a horizontal (comb-type) stirrer, one stirring part corresponds to one vertical stirrer. In the case where a plurality of stirring parts are immersed in the glass melt from one horizontal stirrer, the stirring parts are regarded as equal to a plurality of vertical stirrers.

In the case of disposing a vertical stirrer, the plurality of rotational speeds may all be the same, but the rotational speeds of some stirrers may be intentionally increased or decreased by taking into account the balance between bubbles and homogeneity. The rotational speed and direction of rotation may be set differently for one or plurality of stirrers near the side wall of the neck part 14 and for the other one or more stirrers. For example, in the case where in the neck part 14, an odd number of stirrers are provided along the width direction of the neck part 14, it may be possible that the stirrer in the width-direction center is fast in rotation and at the same time, the rotation of stirrers on both sides of the central stirrer is a counter rotation. By taking such a configuration, the glass flowed in the central stirrer along the flow caused by the rotation of stirrers on both side is further stirred by the central stirrer, so that a homogeneous glass with a fine ream period can be easily obtained.

Furthermore, in the case where, for example, the stirrer in the width-direction center is set into slow rotation, a glass liquid can more easily pass through the central stirrer and consequently, the convection can be promoted.

It is also preferable to use the following method.

That is, in a melting tank having a melting bath and a neck part, the thermal insulation tiles on the side wall of the cooling bath are partially removed. This enables sufficient stirring and convection of the glass in the cooling bath as well, and the ream period and the ream minimum distance can be easily adjusted.

It is also preferable to use the following method.

That is, the ratio of the insertion length of a plurality of coolers present in the upper part of the cooling bath to the width of the cooling bath is intentionally changed upstream and downstream in the range of more than 0 and 0.7 or less, preferably 0.02 or more and 0.5 or less, more preferably 0.05 or more and 0.3 or less, and a strong convection is generated due to a temperature difference between the central part and the end part of the cooling bath, so that the ream period can be adjusted to 30 mm or less.

(AG Processing)

In the cover glass of this embodiment, at least one surface of the glass plate is preferably subjected to AG (antiglare) processing. The method for AG processing is not particularly limited, and a method of applying a surface treatment to the glass main surface to form a desired uneven structure can be utilized.

Specifically, the method includes a method of performing a chemical treatment on a first main surface of the glass plate, for example, a method of applying a frost treatment.

In the frost treatment, for example, a glass plate to be treated is immersed in a mixed solution of hydrogen fluoride and ammonium fluoride, and the immersed surface can thereby be chemically surface-treated.

Other than the method by a chemical treatment, methods including, for example, a so-called sandblasting treatment of spraying a crystalline silicon dioxide powder, a silicon carbide powder, etc. to the glass plate surface by pressurized air; or a physical treatment such as polishing with a water-moistened brush having attached thereto a crystalline silicon dioxide powder, a silicon carbide powder, etc.; can also be utilized.

Among others, in the method of applying a frost treatment of performing a chemical surface treatment by use of a chemical solution such as hydrogen fluoride, microcracks are hardly generated in the surface of a material to be treated, and a reduction in the mechanical strength is less likely to occur, so that this method can be favorably used as the method of applying a surface treatment to the glass plate. The surface on which an uneven structure is formed by the AG processing of the glass plate may have microcracks having a maximum depth of less than 3 μm, because it is difficult for microcracks on this scale to cause a reduction in the mechanical strength.

After an uneven structure is thus formed by a chemical treatment (frost treatment) or a physical treatment, chemical etching of the glass surface is commonly performed so as to trim the surface profile. This enables adjusting the transmission haze to a desired value by the etching amount, removing cracks generated in a sandblasting treatment, etc., and suppressing sparkle.

As the etching, a method of immersing the glass plate to be treated in a solution containing hydrogen fluoride as a main component is preferably used. As for the component other than hydrogen fluoride, an acid such as hydrochloric acid, nitric acid, and citric acid may be contained. By containing an acid, a precipitation reaction can be prevented from locally occurring due to a reaction of a cation component contained in the glass with hydrogen fluoride, and the etching can be caused to uniformly progress in the plane.

With respect to the optical property after AG processing, the transmission haze is preferably 1% or more, more preferably 2% or more, still more preferably 3% or more. This provides the effect that when outside light collides with the glass plate, the light is scattered and the image is blurred, thereby enhancing the visibility of the display body.

The transmission haze is preferably 15% or less, more preferably 12% or less, still more preferably 10% or less. This provides the effect that when black printing process is conducted on a surface not subjected to AG processing of the glass plate, the clearness of black is increased and the design property is enhanced.

As the surface profile after AG processing, the surface roughness (Ra) of the first main surface having an uneven structure is preferably 0.01 μm or more and 0.5 μm or less, more preferably 0.01 μm or more and 0.3 μm or less, still more preferably 0.01 μm or more and 0.2 μm or less. Ra can be measured in conformity with the method specified in JIS B-0601 (2001).

The pitch (RSm) of the uneven structure is preferably 0.003 mm or more, more preferably 0.005 mm or more, still more preferably 0.008 mm or more, yet still more preferably 0.010 mm or more. RSm is preferably 0.050 mm or less, more preferably 0.040 mm or less, still more preferably 0.030 mm or less. RSm can be measured in conformity with the method specified in JIS B-0601 (2001).

As the height data used for using parameters of the surface profile, it is preferable to use a height data obtained using a laser microscope (trade name: VK-9700, manufactured by Keyence Corporation) by setting a visual field range of 300 μm×200 μm on the measurement surface of a sample, measuring the height information of the glass plate, and performing cutoff correction. A cutoff value of 0.08 mm is preferably used.

The ratio of the ream period to RSm is preferably 100 or more and 1,000 or less, more preferably 150 or more and 900 or less, still more preferably 200 or more and 500 or less. Within this range, deterioration of the visibility due to interference between the uneven structure and the ream period after AG processing can be more successfully suppressed.

As the index for evaluating the optical property after AG processing, an anti-sparkle value S, a reflection image diffusiveness index value R, and a clarity value T are suitably used.

The anti-sparkle value S is preferably 0.84 or more, more preferably 0.87 or more, still more preferably 0.9 or more. The anti-sparkle value S is preferably 0.95 or less.

The reflection image diffusiveness index value R is preferably 0.02 or more, more preferably 0.04 or more, still more preferably 0.06 or more. The reflection image diffusiveness index value R is preferably 0.5 or less.

The clarity value T is preferably 0.8 or more, more preferably 0.85 or more, still more preferably 0.9 or more. The clarity value T is preferably 0.95 or less.

The definition and measuring method of each index value are described below.

<Anti-Sparkle Value S>

In the present description, as an index of sparkle, an anti-sparkle value S measured by the following procedure is used. The anti-sparkle value S represents the extent to which the bright spot unevenness, caused when light (image) from a display image is scattered on the glass plate surface at the time of passing through the glass plate and the scattered lights interfere with one another, is detected. It has been confirmed that the anti-sparkle value S exhibits a good correlation with the results of visual judgment of sparkle by an observer. For example, there is a tendency that a glass plate having a small anti-sparkle value S produces conspicuous sparkle and, conversely, a glass plate having a large anti-sparkle value S exhibits reduced sparkle.

Figure 2:
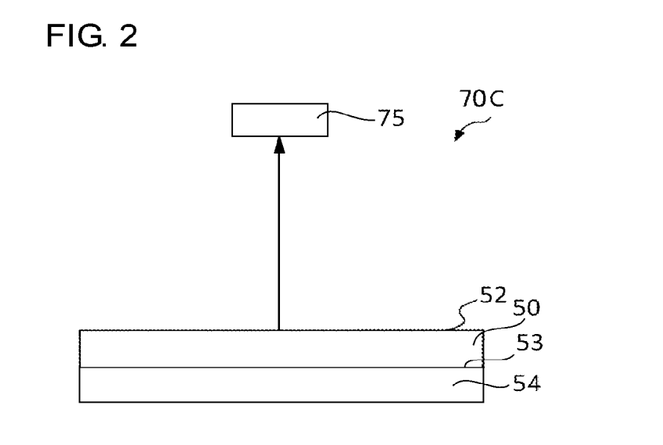
FIG. 2 is a schematic diagram illustrating one example of the measuring apparatus used at the time of measurement of an anti-sparkle value S.

Next, the measuring method of the anti-sparkle value S of the glass plate is described by referring to FIG. 2. FIG. 2 schematically illustrates a measuring apparatus 70C used at the time of measurement of an anti-sparkle value S.

When measuring the anti-sparkle value S, first, a display device 54 (iPad (registered trademark)-Air; resolution: 264 ppi) is prepared. On the visual surface side of the display device, a cover may be provided for the purpose of, e.g., preventing breakage.

Next, a sample to be measured, i.e., a glass plate 50 is disposed on the visual surface side of the display device 54. In the case where AG processing is applied to the first main surface 52 that is one main surface of the glass plate 50, the glass plate 50 is disposed on the visual surface side of the display device 54 so that the first main surface 52 is arranged on the side (detector 75 side) opposite to the display device 54. In other words, the second main surface 53 that is another main surface is disposed on the display device 54.

Next, in the state of the display device 54 being turned ON to display an image, image analysis is performed using an analyzer (SMS-1000; manufactured by Display-Messtechnik & Systeme [DM&S] GmbH & Co. KG) to determine the degree of sparkle of the glass plate 50, and sparkle $S_a$ expressed as a Sparkle value is thereby obtained.

At the time of measurement, a single-color image of green composed of RGB (0, 255, 0) is preferably displayed over the entire display screen of the display device 54 so as to reduce the effect such as difference in vision due to a difference in display color as much as possible. The distance d between a solid-state image sensor and the glass plate 50 is set to 540 mm. When this distance d is expressed by the distance index r, it corresponds to r=10.8.

Here, the distance index r is represented by the following formula using a focal length f of the solid-state image sensor and the distance d between the solid-state image sensor and the glass plate 50:

Distance index $r$=(distance $d$ between solid-state image sensor and glass plate)/(focal length $f$ of solid-state image sensor)

Next, in the reference sample, the same measurement is conducted. The reference sample is a glass plate (VRD140 Glass; manufactured by Asahi Glass Europe) having the same thickness as the glass plate 50.

The Sparkle value obtained is denoted as sparkle $S_s$.

From the obtained $S_a$ and $S_s$, the anti-sparkle value S of the glass plate 50 is calculated according to the following formula (s):

Anti-sparkle value $S=1-(S_a/S_s)$           formula (s)

In this measurement, as a camera lens, 23FM50SP lens having a focal length of 50 mm is preferably used with an aperture of 5.6.

<Reflection Image Diffusiveness Index Value R>

In the present description, as an index of antiglare property, a reflection image diffusiveness index value R measured by the following procedure is used. The reflected image diffusiveness represents the extent to which a reflected image of an object (for example, lighting) placed around the glass plate matches with the original object, and it has been confirmed that this index value exhibits a good correlation with the results of visual judgment of antiglare property by an observer. For example, a glass plate exhibiting a small value (close to 0) for the reflection image diffusiveness index value R has poor antiglare property and, conversely, a glass plate exhibiting a large value (as large as nearly 1) for the reflection image diffusiveness index value R has good antiglare property.

Figure 3:
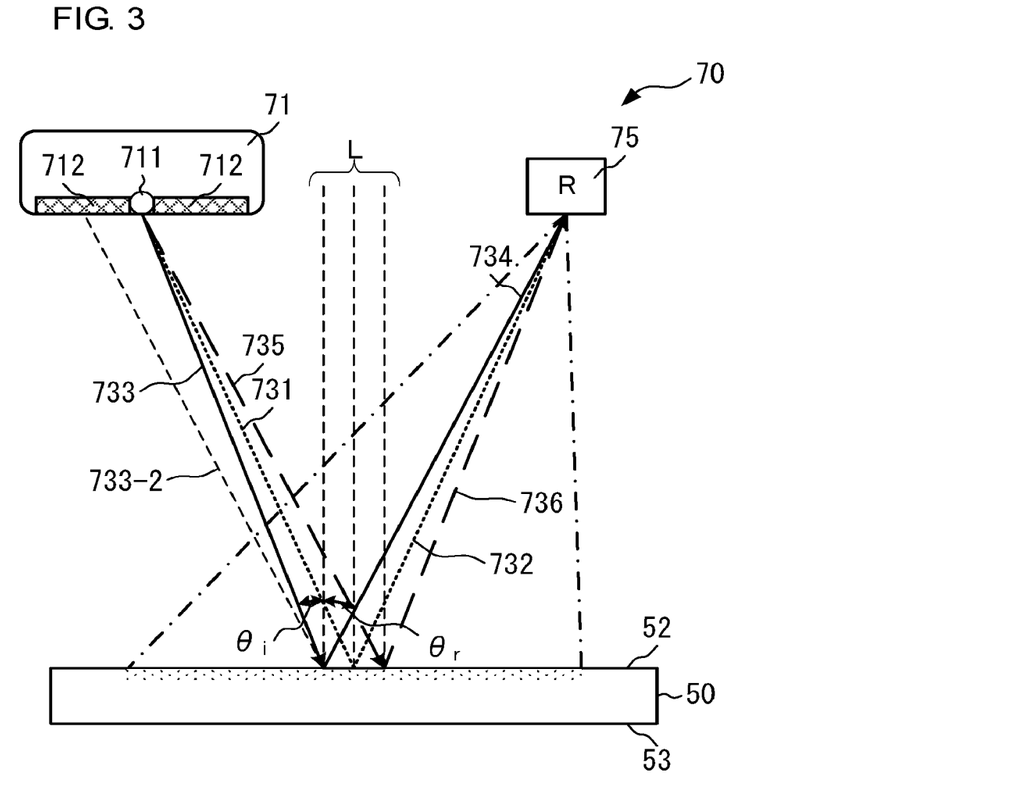
FIG. 3 is a schematic diagram illustrating one example of the measuring apparatus used at the time of measurement of a reflection image diffusiveness index value R.

The measuring method of the reflection image diffusiveness index value R of the glass plate 50 is described by referring to FIG. 3. FIG. 3 schematically illustrates one example of the measuring apparatus used at the time of measurement of the reflection image diffusiveness index value R.

As illustrated in FIG. 3, the measuring apparatus 70 has a linear light source device 71 and a surface brightness measuring instrument 75, and a sample to be measured, i.e., the glass plate 50, is disposed in the measuring apparatus 70. The linear light source device 71 consists of a light source 711 and a black flat plate 712, and the light source 711 is provided in a slit-like opening of the black flat plate 712. The glass plate 50 has a first main surface 52 to be subjected to AG processing and a second main surface 53. The linear light source device 71 is disposed to face the glass plate 50 and extend in a direction perpendicular to the paper surface in FIG. 3. The surface brightness measuring instrument 75 is disposed in a plane perpendicularly crossing with the linear light source device 71 at the paper-surface vertical-direction center of the linear light source device 71. The focal point of the surface brightness measuring instrument 75 is set at an image of the linear light source device 71 reflected by the glass plate 50. Moe specifically, the surface where the image comes into focus is caused to match with the black flat plate 712. Here, out of light made incident from the linear light source device 71, reflected by the glass plate 50 and entered the surface brightness measuring instrument 75, when attention is focused on a light beam with the incident angle θi and the reflection angle θr being equal (hereinafter referred to as first incident light 731 and first reflected light 732), θi=θr=5.7° is established.

The glass plate 50 is disposed such that the first main surface 52 is on the side of the linear light source device 71 and the surface brightness measuring instrument 75. On the second main surface 53 side of the glass plate 50, a black plate is disposed. Accordingly, the light detected by the surface brightness measuring instrument 75 is a reflected light reflected by the glass plate 50.

Next, the measuring method is described. For example, focusing on a light beam 733 and a light beam 734 where the difference θr−θi between the incident angle θi and the reflection angle θr is =0.5°, the light beam 734 represents a component scattered on the glass plate 50 in a direction deviated by 0.5° from regular reflection. The light beam coming from this direction is, in the surface brightness measuring instrument 75, observed as an image of a portion where the black flat plate 712 intersects with a virtual incident light 733-2 (a light beam made incident at an angle that causes the incident angle to be equal to the reflection angle of the light beam 734). More specifically, when surface brightness is acquired by the surface brightness measuring instrument 75, an image where light scattered on the first main surface 52 of the glass plate 50 is spread, centering on a bright line corresponding to regular reflection of the linear light source device 71, to the right and left from the bright line is obtained. A brightness cross-sectional profile is extracted in a direction perpendicular to the bright line. In order to increase the measurement accuracy, data may be accumulated in a direction parallel to the bright line.

First, out of light made incident on the first main surface 52 of the glass plate 50, the brightness of the first reflected light 732 regularly reflected is denoted as R1. The incident angle θi of the first incident light 731 is 5.7°, and the reflection angle θr of the first reflected light 732 is 5.7° The angle that the light beam changes due to reflection by the glass plate 50 can be written as θr-θi and is 0°. Since an error is included practically, θr-θi is in the range of 0°±0.1°.

Next, the brightness of a light beam 733 and a light beam 734, in which the difference θr-θi between the incident angle θi and the reflection angle θr is 0.5°, is denoted as R2. This light beam represents a component scattered by the glass plate 50 in a direction deviated by 0.5° from regular reflection. Since an error is included practically, the difference is θr-θi=0.5°±0.1°.

Similarly, the brightness of a light beam 735 and a light beam 736, in which θr-θi=−0.5°, is denoted as R3. This light beam represents a component scattered by the glass plate 50 in a direction deviated by −0.5° from regular reflection. Since an error is included practically, the difference is θr-θi=−0.5°±0.1°.

Using the obtained brightness R1, brightness R2 and brightness R3, the reflection image diffusiveness index value R of the glass plate 50 is calculated according to the following formula (r):

Reflection image diffusiveness index value $R=(R2+R3)/(2 \times R1)$           formula (r)

These measurements can be conducted using the apparatus SMS-1000 manufactured by DM&S GmbH & Co. KG. In the case of using this apparatus, a C1614A lens having a camera lens focal length of 16 mm is used with an aperture of 5.6. The distance from the first main surface 52 of the glass plate 50 to the camera lens is set to about 300 mm, and the Imaging Scale is set in the range of 0.0276 to 0.0278. The dimension of the slit-like opening formed by the black flat plate 712 of the linear light source device 71 is 101 mmxl mm.

<Clarity Value T>

In the present description, as an index of visibility, a clarity value T measured by the following procedure is used. The clarity represents the extent to which an image matching with a display image is obtained when the display image is visually recognized through a glass plate, and it has been confirmed that this index value exhibits a good correlation with the results of visual judgment of visibility by an observer.

For example, a glass plate exhibiting a small value (close to 0) for the clarity value T has poor visibility and, conversely, a glass plate exhibiting a large value for the clarity value T has good visibility. Accordingly, the clarity value T can be used as a quantitative index when judging the visibility of a glass plate.

The measurement of the clarity value T is performed using SMS-1000 manufactured by DM&S (Display-Messtechnik & Systeme) GmbH & Co. KG by the following procedure.

A glass plate is placed in a position 30 mm away from the top of a slit-like white light source of 40 mm in length and 0.1 mm in width by arranging the first main surface side of the glass plate, to which AG processing is applied, to be on the light source side, and the brightness is measured from above the glass plate.

On the assumption the direction parallel to the thickness direction of the glass plate is at an angle $\theta=0°$, denoting the average value of brightness in a range of angle $\theta=0°\pm0.1°$ as T1, the average value of brightness in a range of angle $\theta=0.7°\pm0.1$ as T2, and the average value of brightness in a range of angle $\theta=-0.7°\pm0.1°$ as T3, the value calculated according to the following formula (t) is defined as the clarity value T:

Clarity value $T=1-(T2+T3)/(2\times T1)$ (t)

Figure 4:
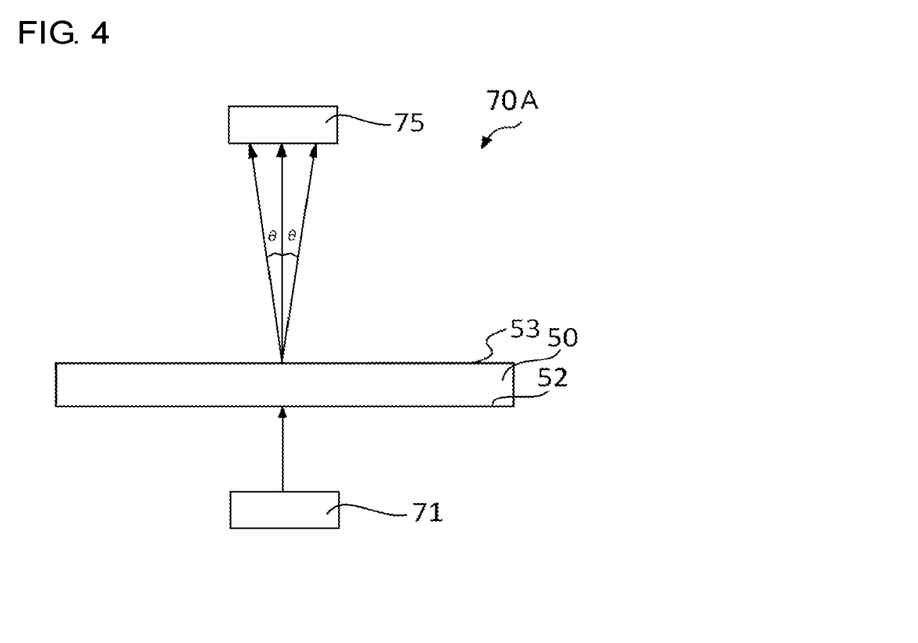
FIG. 4 is a schematic diagram illustrating one example of the measuring apparatus used at the time of measurement of a clarity value T.

More specifically, one embodiment of the method for measuring the clarity value T of the glass plate 50 is described by referring to FIG. 4.

The measuring apparatus 70A has a light source 71 and a detector 75, and a sample to be measured, i.e., the glass plate 50 is disposed inside the measuring apparatus 70A. The glass plate 50 has a first main surface 52 where AG processing is applied, and a second main surface 53. The light source 71 radiates first light in a direction parallel to the thickness direction of the glass plate 50 toward the glass plate 50 from the first main surface 52 side, and the brightness of transmitted light after passing of the first light through the glass plate 50 is detected and analyzed by the detector 75 located on the second main surface 53 side of the glass plate 50.

On the assumption the direction parallel to the thickness direction of the glass plate 50 is at angle $\theta=0°$, the clarity value T of the glass plate 50 is calculated from the average value (T1) of the brightness detected in the range of angle $\theta=0°\pm0.1°$, the average value (T2) of the brightness detected in the range of angle $\theta=0.7°\pm0.1°$, and the average value (T3) of the brightness detected in the range of the angle $\theta=-0.7°\pm0.1°$ according to formula (t).

The minus (−) sign in the angle $\theta$ indicates counterclockwise inclination with respect to first light made incident, and the plus (+) sign indicates clockwise inclination with respect to first light made incident.

(Chemical Strengthening)

The cover glass of this embodiment is preferably subjected to a chemical strengthening treatment.

The method for the chemical strengthening treatment is not particularly limited, and the main surface of the glass plate is ion-exchanged to form a surface layer (surface compressive stress layer) in which a compressive stress remains. Specifically, at a temperature not more than the glass transition temperature, alkali metal ions (for example, Li ion, Na ion) having a small ionic radius contained in the glass near the main surface of the substrate are substituted by alkali metal ions having a larger ionic radius (for example, Na ion or K ion for Li ion, and K ion for Na ion). This allows a compressive stress to remain in the main surface of the glass, and the strength of the glass plate is enhanced.

The glass plate preferably satisfies the following conditions.

That is, the surface compressive stress (hereinafter, referred to as CS) of the glass plate is preferably 400 MPa or more, more preferably 500 MPa or more, still more preferably 700 MPa or more. When CS is in this range, the strength is sufficient in practice.

On the other hand, CS is preferably 1,200 MPa or less, more preferably 900 MPa or less. When CS is in this range, the glass plate can withstand its own compressive stress and is free of a concern about being naturally broken.

Furthermore, the depth of the surface compressive stress layer (hereinafter, referred to as DOL) of the glass plate is, in the case of substituting Na ion in the glass by K ion, preferably 10 µm or more, more preferably 15 µm or more, still more preferably 20 µm or more. When DOL is in this range, a concern about being easily scratched and broken does not occur even when a sharp jig such as glass cuter is used.

On the other hand, DOL is preferably 150 µm or less, more preferably 50 µm or less, still more preferably 40 µm or less. When DOL is in this range, the glass plate can withstand its own compressive stress and is free of a concern about being naturally broken.

In the case where the glass plate contains $Li_2O$, the strength can be more enhanced by applying the chemical strengthening treatment twice or more.

Specifically, for example, in the first treatment, the glass plate is brought into contact with an inorganic salt composition mainly containing, e.g., sodium nitrate salt to effect ion-exchange between Na and Li. Subsequently, in the second treatment, the glass plate is brought into contact with an inorganic salt composition mainly containing, e.g., potassium nitrate salt to effect ion-exchange between K and Na. This is advantageous in that a compressive stress layer having deep DOL and high CS can be formed.

In this case, DOL is preferably 60 µm or more, more preferably 80 µm or more, still more preferably 100 µm or more. DOL here is preferably 200 m or less, more preferably 150 µm or less, still more preferably 120 µm or less.

(Antifouling Layer)

In the cover glass of this embodiment, an antifouling layer is preferably provided on/above the first main surface.

The antifouling layer is a film that prevents adhesion of an organic material or an inorganic material to the surface, or a layer that brings about an effect of, even when an organic material or an inorganic material adheres to the surface, enabling the adhering material to be easily eliminated by cleaning such as wiping.

The antifouling layer is preferably provided on a surface of the later-described adhesive layer. The antifouling layer is not particularly limited as long as it can impart an antifouling property to the glass plate, but the antifouling layer is preferably composed of a fluorine-containing organic silicon compound coating obtained by curing a fluorine-containing organic silicon compound through a hydrolysis/condensation reaction.

The thickness of the antifouling layer is not particularly limited, but in the case where the antifouling layer is composed of a fluorine-containing organic silicon compound coating, the thickness is, in terms of the film thickness on the first main surface, preferably 2 nm or more and 20 nm or less, more preferably 2 nm or more and 15 nm or less, still more preferably 2 nm or more and 10 nm or less. When the film thickness on the first main surface is 2 nm or more, the top of the first main surface of the glass plate is in the state of being uniformly covered with the antifouling layer, and this makes it possible to withstand practical use in view of abrasion resistance. When the film thickness on the first main surface is 20 nm or less, the glass plate in the state that an antifouling layer is formed exhibits good optical properties such as transmission haze.

The composition for forming the antiglare layer is not particularly limited as long as it is a composition containing a fluorine-containing hydrolyzable silicon compound and is a composition capable of forming the antifouling layer by a dry deposition method. The composition for the formation of the antifouling layer may contain optional components other than the fluorine-containing hydrolyzable silicon compound, or may be composed of only the fluorine-containing hydrolyzable silicon compound. The optional components include a hydrolyzable silicon compound containing no fluorine atom (hereinafter, referred to as "non-fluorine hydrolyzable silicon compound"), a catalyst, etc., which are used to an extent not impairing the effect of this embodiment.

At the time of blending the fluorine-containing hydrolyzable silicon compound and the optional non-fluorine hydrolyzable silicon compound to form a composition for the coating formation, each compound may be blended as it is or may be blended as its partial hydrolysis condensate. In addition, these compounds may be blended, in a composition for the coating formation, as a mixture of each compound and its partial hydrolysis condensate.

In the case of using two or more kinds of hydrolyzable silicon compounds in combination, each compound may be blended as it is in the composition for the coating formation or each compound may be blended as a partial hydrolysis condensate or, furthermore, may be blended as a partial hydrolysis co-condensate of two or more kinds of compounds. In addition, a mixture of these compound, partial hydrolysis condensate, and partial hydrolysis co-condensate may also be used. However, the partial hydrolysis condensate and partial hydrolysis co-condensate used should have a degree of polymerization that can be formed by a dry deposition method. In the following, the term "hydrolyzable silicon compound" is used in an inclusive sense encompassing such a partial hydrolysis condensate and partial hydrolysis co-condensate as well as the compound itself.

The fluorine-containing hydrolyzable silicon compound used for forming the fluorine-containing organic silicon compound of this embodiment is not particularly limited as long as the obtained fluorine-containing silicon compound coating has an antifouling property such as water repellency, oil repellency, etc.

Specifically, the fluorine-containing hydrolyzable silicon compound includes a fluorine-containing hydrolyzable silicon compound having one or more groups selected from the group consisting of a perfluoropolyether group, a perfluoroalkylene group and a perfluoroalkyl group. These groups exist as a fluorine-containing organic group bonded to a silicon atom of a hydrolyzable silyl group, directly or through a linking group. As a commercially available fluorine-containing organic silicon compound (fluorine-containing hydrolyzable silicon compound) having one or more groups selected from the group consisting of a perfluoropolyether group, a perfluoroalkylene group and a perfluoroalkyl group, KP-801 (trade name, produced by Shin-Etsu Chemical Co., Ltd.), X-71 (trade name, produced by Shin-Etsu Chemical Co., Ltd.), KY-130 (trade name, produced by Shin-Etsu Chemical Co., Ltd.), KY-178 (trade name, produced by Shin-Etsu Chemical Co., Ltd.), KY-185 (trade name, produced by Shin-Etsu Chemical Co., Ltd.), KY-195 (trade name, produced by Shin-Etsu Chemical Co., Ltd.), Afluid (registered trademark) S-550 (trade name, produced by AGC Inc.), Optool (registered trademark) DSX (trade name, produced by Daikin Industries, Ltd.), etc. may be preferably used. Among these, it is more preferable to use KY-195, Optool DSX or S-550.

(Adhesive Layer)

The adhesive layer is provided between the glass plate and the antifouling layer so as to enhance the durability of the antifouling layer. In view of adhesion to the antifouling layer, the outermost layer of the adhesive layer preferably uses silicon oxide as a main component.

In the adhesive layer, the surface roughness of a layer in contact with the antifouling layer is, in terms of an arithmetic average roughness (Ra), preferably 3 nm or less, more preferably 2 nm or less, still more preferably 1.5 nm or less. When Ra is 3 nm or less, cloth, etc. can be deformed along the uneven structure of the antifouling layer and in turn, a load is imposed approximately evenly on the entire surface of the antifouling layer. This is considered to suppress separation of the antifouling layer and enhance the abrasion resistance.

At the time of measurement of the arithmetic average roughness (Ra) of the adhesion layer, in the case where the first main surface has an uneven structure, the measurement region is set not to detect the uneven structure.

The adhesive layer or antifouling layer is usually sufficiently thin relative to the uneven structure and the surface roughness is sufficiently smooth relative to the uneven structure. Therefore, various numerical values relating to the surface profile measured in a region sufficiently including the uneven structure in the state of having the adhesive layer or antifouling layer can be considered to be the same as numerical values of the uneven structure.

(Low Reflection Layer)

The low reflection layer is a film producing an effect of reflectance reduction and reducing glare due to reflection of light, which, additionally, can enhance the transmittance of light from a display device, etc. and can improve the visibility of a display device, etc.

The glass plate of this embodiment preferably has a low reflection layer between at least part of a main surface, an intervening surface and an end face and the antifouling layer. The configuration of the low reflection layer is not particularly limited as long as it can suppress reflection of light, and, for example, a configuration where a high-refractiveindex layer having a refractive index of 1.9 or more at a wavelength of 550 nm and a low-refractive-index layer may have a refractive index of 1.6 or less at a wavelength of 550 nm are stacked can be employed. The layer may also have a configuration consisting of only one low-refractive-index layer.

The low reflection layer may have a configuration including one high-refractive-index layer and one low-refractive-index layer or may have a configuration including two or more high-refractive-index layers and two or more low-refractive-index layers. In the case of including two or more high-refractive-index layers and two or more low-refractive-index layers, a configuration where the high-refractive-index layer and the-low-refractive index layer are stacked alternately, is preferred.

In order to enhance the low reflection property, the low reflection layer is preferably a laminate in which a plurality of layers are stacked. For example, in the laminate, it is preferable to stack, as a whole, 2 or more layers and 10 or less layers, more preferable to stack 2 or more layers and 8 or less layers, and still more preferable to stack 4 or more layers and 6 or less layers. The laminate here is preferably a laminate in which high refractive index layers and low refractive index layers are stacked as described above. In addition, the total of the number of high-refractive-index layers and the number of low-refractive-index layers is preferably within the range above.

The material of each of the high-refractive-index layer and the low-refractive-index layer is not particularly limited and may be appropriately selected in consideration of the required degree of low reflection, required productivity, etc. As the material constituting the high-refractive-index layer, one or more selected from niobium oxide ($Nb_2O_5$), titanium oxide ($TiO_2$), zirconium oxide ($ZrO_2$), tantalum oxide ($Ta_2O_5$) and silicon nitride ($Si_3N_4$) may be preferably used. As the material constituting the low-refractive-index layer, one or more selected from silicon oxide ($SiO_2$), a material containing a mixed oxide of Si and Sn, a material containing a mixed oxide of Si and Zr, and a material containing a mixed oxide of Si and Al may be preferably used.

In view of productivity or refractive index, a configuration where the high-refractive-index layer is a layer containing, as a main component, one selected from niobium oxide, tantalum oxide and silicon nitride and the low-refractive-index layer is a layer containing silicon oxide as a main component, is preferred.

By letting the outermost layer of the low reflection layer contain silicon oxide as a main component, the low reflection layer can also be used as an adhesion layer.

(Method for Forming Functional Layer)

For the sake of convenience, a layer including the above-described antifouling layer, adhesive layer and low reflection layer is referred to as a functional layer.

The functional layer of this embodiment is formed by a dry deposition method. The dry deposition method includes, for example, a vapor deposition method, an ion beam-assisted vapor deposition method, an ion plating method, a sputtering method, and a plasma CVD method, and among others, a vapor deposition method or a sputtering method is preferred.

In the case where the functional layer is composed of a plurality of layers, the functional layer may be formed by combining the above-described methods. For example, it is possible to form an adhesion layer by a sputtering method and then form an antifouling layer by a vapor deposition method.

In the case of forming an antifouling layer, a vapor deposition method is preferably used. Among vapor deposition methods, a resistance-heating vapor deposition method and an electron-beam vapor deposition method are more preferably used.

In the case of forming an adhesion layer or a low reflection layer, a vapor deposition method or a sputtering method is preferably used.

The vapor deposition method is more preferably an ion-assisted vapor deposition method of depositing a film while forming a plasma.

As the sputtering method, a magnetron sputtering method is generally used, and among others, a pulsed magnetron sputtering method, an AC magnetron sputtering method, and a post-oxidation magnetron sputtering method are more preferred.

When such a method is used, a dense functional layer having an accurately controlled film thickness is obtained.

EXAMPLES

In the following, Ex. 1 to Ex. 7 are Examples, and Ex. 8 is Comparative Example.

(Ex. 1)

First, a plate glass having the following composition was produced (glass composition: A).

$SiO_2$: 64.4 mol %
$Al_2O_3$: 8 mol %
$Na_2O$: 12.5 mol %
$K_2O$: 4 mol %
MgO: 10.5 mol %
CaO: 0.1 mol %
SrO: 0.1 mol %
BaO: 0.1 mol %
$ZrO_2$: 0.5 mol %

At the time of production of the plate glass, 5 stirrers were disposed along the width direction in the neck part of a melting tank, and the plate glass was produced by a float process under the following vertical stirrer conditions (ream adjusting method: stirrer A).

More specifically, one stirrer located in the width-direction center of the neck part was rotated at a rotational speed of 25 rpm and set to rotate clockwise when viewed from the upper side of the melting tank. Two stirrers located on the left side when viewed from the upstream side of the melting tank were rotated at a rotational speed of 10 rpm and set to rotate clockwise in the same phase when viewed from the upper side of the melting tank. Two stirrers located on the right side when viewed from the upstream direction of the melting tank were rotated at a rotational speed of 10 rpm and set to rotate counterclockwise in the same phase when viewed from the upper side of the melting tank.

In this way, a plate glass having a plate thickness of 1.3 mm, in which the ream minimum distance and the ream period are adjusted, was obtained.

Thereafter, the plate glass was cut along the direction of ream into a rectangle of 15 cm×25 cm to obtain a glass plate.

Next, one surface of the glass plate was covered with a PET film and immersed in a solution containing 25 mass % of ammonium fluoride and 36 mass % of hydrogen fluoride, thereby performing a frost treatment. Thereafter, the glass plate was washed to dissolve a salt covering the surface and then immersed in a solution containing 3 mass % of hydrogen fluoride for about 35 minutes, thereby performing a 110 μm etching treatment to form an uneven structure on the first main surface of the glass plate (AG processing method: method A).

Subsequently, a chemical strengthening treatment was performed by immersing the glass plate in a bath in which potassium nitrate salt is dissolved.

A chemically strengthened glass plate having an uneven structure on one main surface (first main surface) was obtained by the procedure above.

(Ex. 2)

The same procedure as in Ex. 1 was performed except that at the time of production of the glass, the stirrers were set to the following conditions (ream adjusting method: stirrer B).

More specifically, one stirrer located in the width-direction center of the neck part was rotated at a rotational speed of 5 rpm and set to rotate clockwise when viewed from the upper side of the melting tank. Two stirrers located on the left side when viewed from the upstream side of the melting tank were rotated at a rotational speed of 20 rpm and set to rotate clockwise in the same phase when viewed from the upper side of the melting tank. Two stirrers located on the right side when viewed from the upstream direction of the melting tank were rotated at a rotational speed of 20 rpm and set to rotate counterclockwise in the same phase when viewed from the upper side of the melting tank.

(Ex. 3)

The same procedure as in Ex. 1 was performed except that in the AG processing, the immersion time in the etching solution was changed to about 25 minutes to perform 80 μm etching so as to change the uneven structure (AG processing method: method B). The rest was conducted in the same manner as in Ex. 1.

(Ex. 4)

The same procedure as in Ex. 1 was performed except that at the time of production of the glass, the following conditions were set.

First, 5 stirrers in the neck part all were rotated at a rotational speed of 20 rpm and all were rotated clockwise in the same phase when viewed from the upper side of the melting tank.

Then, in the cooling bath, the thermal insulation tiles usually provided on the side wall of the cooling bath were partially removed to increase the heat gradient. In this way, glass convection in the cooling bath was promoted, and the ream minimum distance and the ream period were thereby adjusted (ream adjusting method: convection 1).

(Ex. 5)

The same procedure as in Ex. 1 was performed except that at the time of production of the glass, the following conditions were set.

First, 5 stirrers in the neck part all were rotated at a rotational speed of 20 rpm and all were rotated clockwise in the same phase when viewed from the upper side of the melting tank.

Then, in the upstream part and downstream part of the cooling bath, coolers were inserted from the side wall in the upper part of the cooling bath. At this time, the insertion length was set, in the upstream part, to 0.3 times the width of the cooling bath and, in the downstream part, to 0.1 times the width of the cooling bath. Since this allows the upstream part to be comparatively cooled, the convection from the downstream part to the upstream part was promoted, and the ream minimum distance and the ream period were thereby adjusted (ream adjusting method: convection 2).

(Ex. 6)

First, a plate glass having the following composition was produced (glass composition: E):

$SiO_2$: 66.2 mol %
$Al_2O_3$: 11.2 mol %
$Li_2O$: 10.4 mol %
$Na_2O$: 5.6 mol %
$K_2O$: 1.5 mol %
$MgO$: 3.1 mol %
$CaO$: 0.2 mol %
$ZrO_2$: 1.3 mol %
$TiO_2$: 0.12 mol %
$Y_2O_3$: 0.5 mol %

The glass production was performed in the same manner as in Ex. 1 to obtain a 1.3 mm-thick glass plate of 15 cm×25 cm.

In the AG processing, the concentration of ammonium fluoride was set to 30 mass % and the immersion time was adjusted to give an etching amount of 50 μm, thereby changing the uneven structure (AG processing method: method C). The rest was conducted in the same manner as in Ex. 1.

In the chemically strengthening treatment, the glass was immersed first in a molten salt containing sodium nitrate salt to effect ion-exchange between Li in the glass and Na in the molten salt. Then, the glass was immersed in a molten salt containing potassium nitrate salt to effect ion-exchange between Na in the glass and K in the molten salt. In this way, a glass that is chemically strengthened in two steps was obtained.

(Ex. 7)

A glass plate was obtained in the same manner as in Ex. 1 except that at the time of cutting-out of the glass in Ex. 1, the glass was cut out such that a side makes an angle of 45° relative to the direction of ream.

(Ex. 8)

The procedure was conducted in the same manner as in Ex. 1 except that at the time of glass production, the following conditions were set.

More specifically, 5 stirrers in the neck part all were rotated at a rotational speed of 20 rpm and all were rotated clockwise in the same phase when viewed from the upper side of the melting tank. In the column of "Ream Adjusting Method" of Table 1 below, "-" is written.

(Evaluation)

The transmission haze and gloss of each Ex. were measured by a haze meter and a gloss meter, respectively.

As for the uneven structure of each Examples, the height information of the glass plate was measured using a laser microscope (trade name: VK-9700, manufactured by Keyence Corporation by setting a visual field range of 300 μm×200 μm on the measurement surface of a sample and corrected at a cutoff value of 0.08 mm.

The anti-sparkle value S, reflection image diffusiveness index value R and clarity value T of each Examples were measured using a device SMS-1000 manufactured by DM&S GmbH & Co. KG under the conditions described above.

The ream minimum distance and ream period of each Examples were evaluated by the above-described methods.

(Evaluation of Visibility)

The glass plate obtained in each Examples was laminated on a liquid crystal display by arranging the first main surface on which an uneven structure is formed, to serve as a viewing side and providing OCA (optical clear adhesive) on the second main surface on which an uneven structure is not formed.

In this state, the liquid crystal display was displayed in a green color and evaluated whether or not display unevenness due to ream can be observed from a distance of 60 cm. When the rating is A to C, the visibility can be evaluated to be excellent.

A: Display unevenness cannot be observed from every angle.
B: Display unevenness can be slightly observed at some angles.
C: Display unevenness can be observed at some angles.
D: Display unevenness can be observed at almost all angles.

The results of Ex. 1 to Ex. 8 are shown together in Table 1 below.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Before AG processing | Glass composition | A | A | A | A | A | E | A | A |
| | Plate thickness [mm] | 1.3 | 1.3 | 1.3 | 1.3 | 1.3 | 1.3 | 1.3 | 1.3 |
| | Ream adjusting method | stirrer A | stirrer B | stirrer A | convection 1 | convection 2 | stirrer A | stirrer A | — |
| | Ream minimum distance [mm] | 190 | 320 | 190 | 300 | 350 | 280 | 280 | 180 |
| | Ream period [mm] | 18 | 7 | 18 | 9 | 6 | 18 | 18 | 40 |
| After AG processing | AG Processing method | method A | method A | method B | method A | method A | method C | method A | method A |
| | Transmission haze [%] | 2.4 | 2.4 | 12.0 | 2.4 | 2.4 | 5.0 | 2.4 | 2.4 |
| | Gloss | 129 | 129 | 90 | 129 | 129 | 121 | 129 | 129 |
| | Anti-sparkle value S | 0.852 | 0.852 | 0.880 | 0.852 | 0.852 | 0.889 | 0.852 | 0.852 |
| | Reflection image diffusiveness index value R | 0.028 | 0.028 | 0.039 | 0.028 | 0.028 | 0.033 | 0.028 | 0.028 |
| | Clarity value T | 0.969 | 0.969 | 0.965 | 0.969 | 0.969 | 0.975 | 0.969 | 0.969 |
| | Ra [μm] | 0.07 | 0.07 | 0.08 | 0.07 | 0.07 | 0.06 | 0.07 | 0.07 |
| | RSm [μm] | 27 | 27 | 22 | 27 | 27 | 19 | 27 | 27 |
| | RSm [mm] | 0.027 | 0.027 | 0.022 | 0.027 | 0.027 | 0.019 | 0.027 | 0.027 |
| | Ream minimum distance [mm] | 190 | 320 | 190 | 300 | 350 | 280 | 280 | 180 |
| | Ream period [mm] | 18 | 7 | 18 | 9 | 6 | 18 | 18 | 40 |
| | Ream period/RSm | 667 | 259 | 818 | 333 | 222 | 947 | 667 | 1481 |
| | Angle made between ream and pixel [°] | 90 | 90 | 90 | 90 | 90 | 90 | 45 | 90 |
| | Visibility | B | A | B | A | A | B | C | D |

(Summary of Evaluation Results)

As shown in Table 1, it is understood that compared with Ex. 8 where the ream period is not 30 mm or less, the visibility is excellent in Ex. 1 to Ex. 7 where the ream period is 30 mm or less.

Comparing Ex. 1 to Ex. 7, in Ex. 2, Ex. 4 and Ex. 5 where the ream period is 10 mm or less, the visibility was more excellent compared with Ex. 1, Ex. 3, Ex. 6 and Ex. 7 where the ream period is not 10 mm or less.

While the present invention has been described in detail and with reference to specific embodiments thereof, it will be apparent to one skilled in the art that various changes and modifications can be made therein without departing from the spirit and scope thereof.

This application is based on Japanese Patent Application No. 2020-003488 filed on Jan. 14, 2020, the entire subject matter of which is incorporated herein by reference.

1: Glass raw materials
2: Molten glass
10: Melting furnace
11: Melting tank
12: Melting bath
13: Cooling bath
14: Neck part
50: Glass plate
52: First main surface
53: Second main surface
54: Display device
70: Measuring apparatus
70A: Measuring apparatus
70C: Measuring apparatus
71: Linear light source device, light source
711: Light source
712: Black flat plate
731: First incident light
732: First reflected light
733: Light beam
733-2: Virtual incident light
734: Light beam
735: Light beam
75: Surface brightness measuring instrument, detector
E: End part of glass
G: Glass
R: Ream
$R_i$: i-th Ream from end part of glass $R_i$: First ream from end part of glass
S: Screen

The invention claimed is:

1. A cover glass for a display, which is a glass plate having a first main surface and a second main surface,
the cover glass comprising, as represented by mol percentage based on oxides, from 50 to 75% of $SiO_2$, from 5 to 20% of $Al_2O_3$, from 2 to 20% of $Na_2O$, from 0 to 6% of $K_2O$, from 0 to 15% of MgO, from 0 to 10% of a total amount (CaO+SrO+BaO) of CaO, SrO and BaO, from 0 to 5% of a total amount ($ZrO_2$+$TiO_2$) of $ZrO_2$ and $TiO_2$, from 0 to 10% of $B_2O_3$, and from 0 to 20% of $Li_2O$,
having a ream minimum distance of 100 mm or more and 1,000 mm or less, and
having a ream period of 1 mm or more and 30 mm or less.

2. The cover glass for a display according to claim 1, wherein the ream period is 2 mm or more and 10 mm or less.

3. The cover glass for a display according to claim 1, wherein the first main surface has an uneven structure.

4. The cover glass for a display according to claim 3,
wherein a surface roughness Ra of the first main surface is 0.01 μm or more and 0.5 μm or less,
a pitch RSm of the uneven structure of the first main surface is 0.003 mm or more and 0.050 mm or less,
a transmission haze is 1% or more and 15% or less, and
a ratio of the ream period to the RSm is 100 or more and 1,000 or less.

5. The cover glass for a display according to claim 3,
wherein an anti-sparkle value S is 0.84 or more,
a reflection image diffusiveness index value R is 0.02 or more, and
a clarity value T is 0.8 or more.

6. The cover glass for a display according to claim 1, comprising an antifouling layer on or above the first main surface.

7. The cover glass for a display according to claim 1, comprising an adhesive layer and an antifouling layer on or above the first main surface in this order.

8. The cover glass for a display according to claim 1, which has been subjected to a chemical strengthening treatment,
the cover glass having a surface compressive stress of 500 WPa or more and 1,200 MPa or less, and a depth of a surface compressive stress layer of 10 μm or more and 150 μm or less.

9. An in-vehicle display device comprising a display and the cover glass for a display according to claim 1 which covers the display.

10. The in-vehicle display device according to claim 9,
wherein an angle made by a direction parallel to a ream of the cover glass for a display and a pixel direction of the display is 0° or more and 5° or less, or 85° or more and 90° or less.

11. A method for producing the cover glass for a display according to claim 1,
wherein a plurality of stirrers are provided in a neck part of a melting tank along a width direction of the neck part, and a stirring condition of the stirrers is set to be 1 rpm or more and 25 rpm or less.

12. A method for producing the cover glass for a display according to claim 1,
wherein a melting tank comprising a melting bath, a neck part, and a cooling bath is used, and thermal insulation tiles on a side wall of the cooling bath are partially removed.

13. A method for producing the cover glass for a display according to claim 1,
wherein a cooler is inserted into an upper space of a cooling bath by a length of more than 0 and 0.7 or less in terms of a ratio relative to a width of the cooling bath.

* * * * *